United States Patent [19]  [11] 4,164,986
Eloy et al.  [45] Aug. 21, 1979

[54] DEVICE FOR FIXING A PANEL ON AN AUTOMOBILE DASHBOARD

[75] Inventors: Jacques Eloy, Montbeliard; Claude François, Audincourt, both of France

[73] Assignee: Automobiles Peugeot, Paris, France

[21] Appl. No.: 826,680

[22] Filed: Aug. 22, 1977

[30] Foreign Application Priority Data

Sep. 17, 1976 [FR] France .......................... 76 28101

[51] Int. Cl.² .................. B60K 20/08; A44B 17/00
[52] U.S. Cl. .................. 180/90; 24/217 R; 24/211 L; 24/110; 248/27.3; 292/254
[58] Field of Search .................. 24/217, 208 A, 211 L, 24/216; 248/27.3; 180/110, 90; 292/110

[56] References Cited

U.S. PATENT DOCUMENTS

| 607,023 | 7/1898 | Dowse | 24/211 L |
|---|---|---|---|
| 2,442,398 | 6/1948 | Chandler | 24/217 |
| 2,590,264 | 3/1952 | Meyers | 24/216 |
| 2,688,173 | 9/1954 | Van Peet | 24/211 M |
| 2,896,287 | 7/1959 | Stultz | 24/217 |
| 3,853,416 | 12/1974 | Hanan | 24/211 L |
| 3,896,698 | 7/1975 | Aylott | 24/217 |

FOREIGN PATENT DOCUMENTS 1191606 4/1959 France .................. 24/208 A

*Primary Examiner*—Bernard A. Gelak
*Attorney, Agent, or Firm*—Burns, Doane, Swecker & Mathis

[57] ABSTRACT

The present invention relates to a device for removably fixing one element on another, by interlocking, particularly for fixing an instrument panel assembly on the dashboard of an automobile, said device comprising a clip to be fastened to a first element and a pin with a shouldered head to be fastened to a second element which is to be fixed to said first element, said clip being constituted by a frame inside which are connected two resilient lips, defining a central housing for the penetration of said pin and at least one lateral housing for receiving a member for spacing said lips apart in order to release said pin, said lip-spacing member being rotatably mounted on said frame.

9 Claims, 5 Drawing Figures

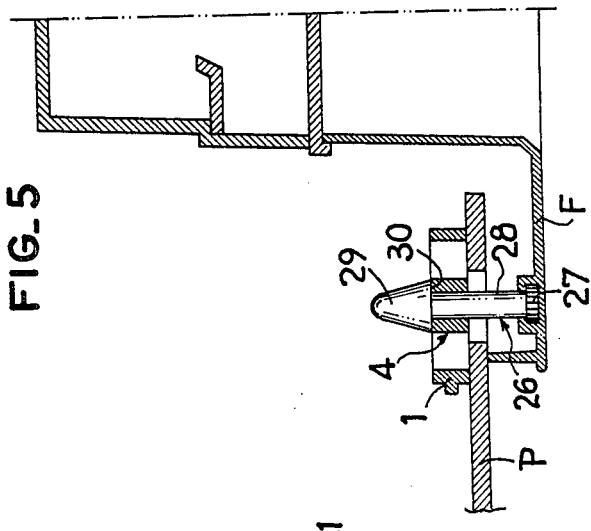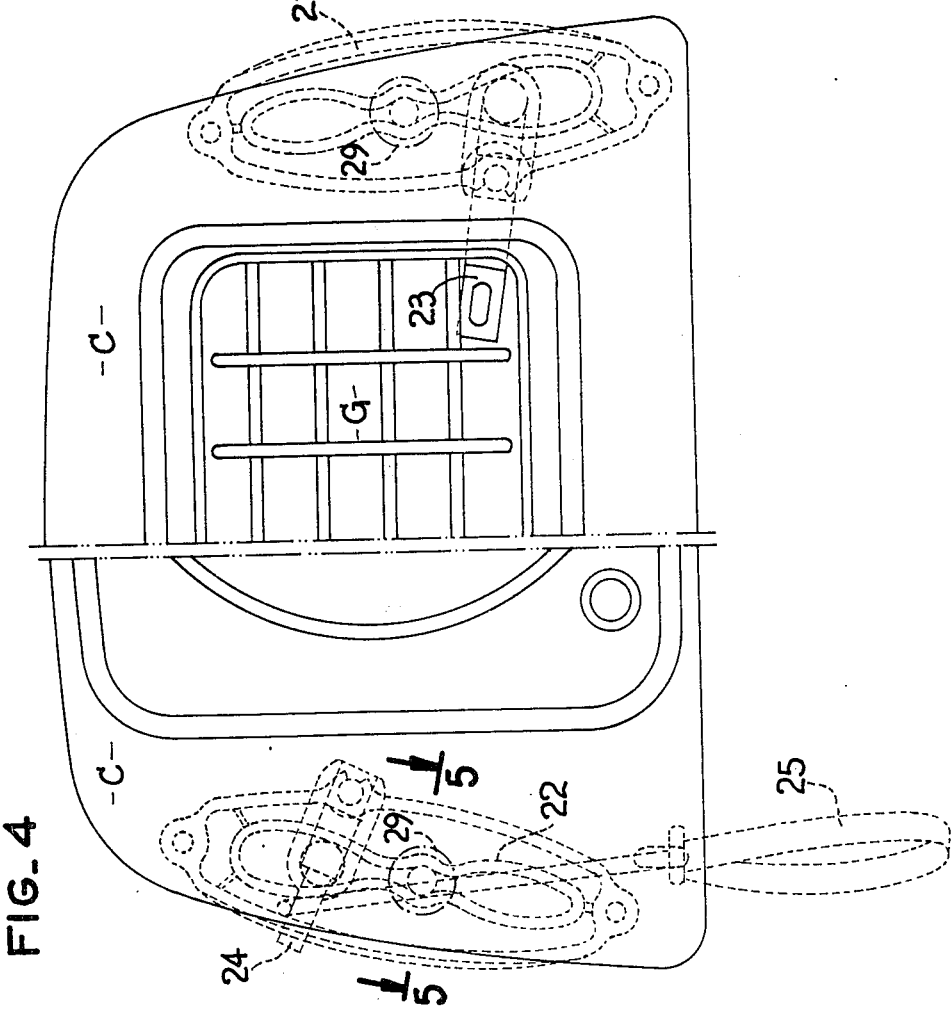

DEVICE FOR FIXING A PANEL ON AN AUTOMOBILE DASHBOARD

The present invention relates to a device for removably fixing one element on another, and particularly for fixing an instrument panel assembly on the dashboard of an automobile.

The instrument panel assembly, comprising all the reading instruments such as speedometer, mileometer, revolution counter, clock, gauges, etc . . . , is generally fixed to the dashboard either by means of screws which have the drawback of being visible, or by means of clips which prevent the assembly from being disassembled, this being a serious inconvenience as, in that case, access to the various elements behind the assembly is impossible.

It is an object of the present invention to remedy the above-mentioned drawbacks by proposing a fixing device which allows an element such as in instrument panel assembly to be fixed to the dashboard of a vehicle and to be readily disassembled whenever necessary.

To this end, the invention relates to a device for removably fixing one element on another, by interlocking, comprising a clip adapted to be securely fastened to a first element and a pin with a shouldered head adapted to be securely fastened to a second element which is to be fixed to said first element, wherein the clip is constituted by a frame inside which are connected two resilient lips defining a central housing for the penetration of said pin and at least one lateral housing adapted to receive a member for spacing said lips apart in order to release said pin, said release member being rotatably mounted on said frame.

The invention will be more readily understood on reading the following description with reference to the accompanying drawings, in which:

FIG. 4 is a view on a larger scale of the ends of the dashboard of FIG. 3;

FIG. 5 is a section along line 5—5 of FIG. 4, showing a fastener integral with the instrument panel assembly, engaged in a clip of the fixing device according to the invention.

Figure 1:
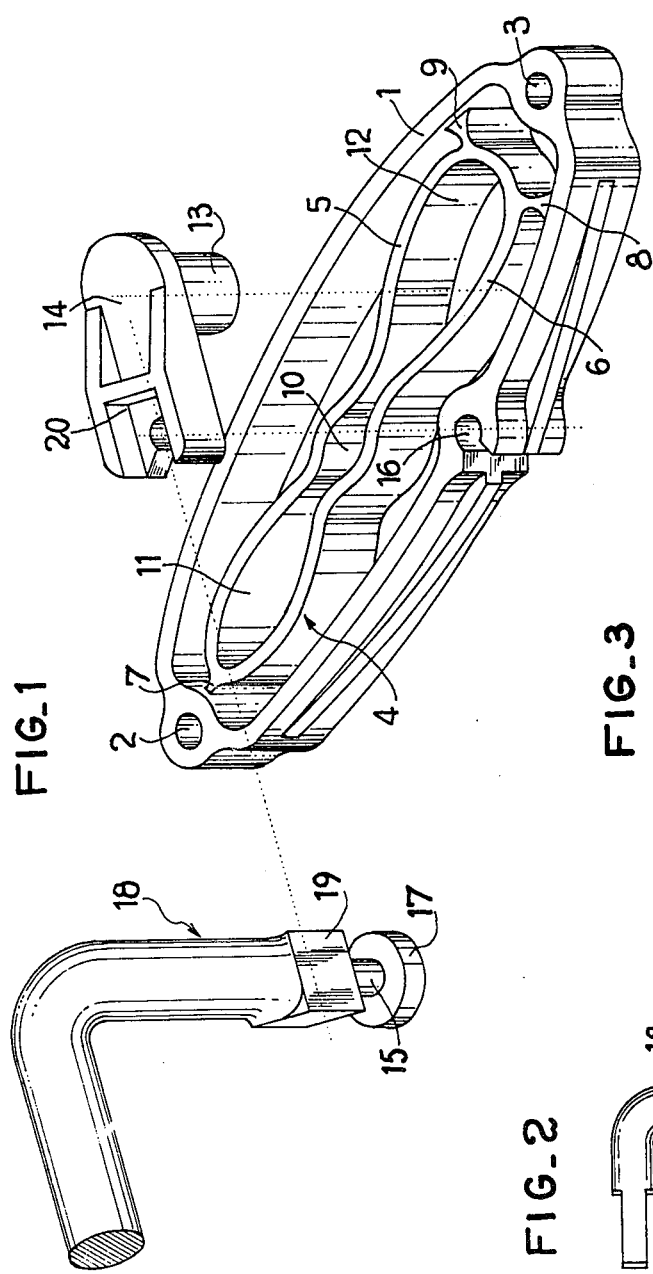
FIG. 1 is an exploded perspective view of a clip which constitutes the main element of a fixing device according to the invention.

Referring now to the drawings, FIG. 1 shows the fixing device according to the invention which essentially comprises a frame 1, generally oval in shape, provided at its two ends with holes 2 and 3 adapted to receive means for fixing the frame 1 on a fixed part of the dashboard of a vehicle.

These fixing means (not shown), which are known per se, are either rivets, self-tapping screws which act by removing matter from said fixed part which is generally made of plastics material such as polyacetal, or threading screws which act by compressing matter.

Inside the frame 1 are mounted two lips 5 and 6 having the general form of a figure-of-eight. The lips 5 and 6 are integral with the frame via lugs 7, 8 and 9, lug 7 connecting a common end of lips 5 and 6 to the end of the frame 1 close to hole 2, whilst lugs 8 and 9 connect the opposite common end of lips 5 and 6 to the end of the frame close to hole 3.

The lips form a central recess 10 adapted to receive the head of a pin, and first and second lateral recesses 12 and 11, which are larger, giving the clip a certain elasticity.

The first lateral recess 12 is adapted to receive a cylindrical finger 13 integral with a rod 14 engaged on a shaft 15 mounted, by interlocking, in an open bore 16, forming bearing, provided in the wall of frame 1.

Figure 2:
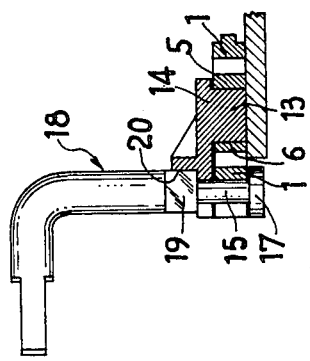
FIG. 2 is a view in section of the clip of FIG. 1, when assembled.

The shaft 15 which terminates in a stop 17, constitutes the extension of a bent lever 18, of which the part 19 close to the shaft 15 is of square cross-section and is engaged in a recess 20 of corresponding cross-section provided in rod 14 (FIG. 2). Thus the lever 18 and part 13, 14 form together a member for spacing apart the lips 5 and 6 of the clip.

By rotating the lever 18, the finger 13 is driven with shaft 15. On rotating, the finger 13 separates the lips 5 and 6 of the clip, this increasing the cross-section of the central recess 10, with the result that a fixing member such as a fastener which is locked by the lips 5 and 6 may be removed from the clip.

Figure 3:
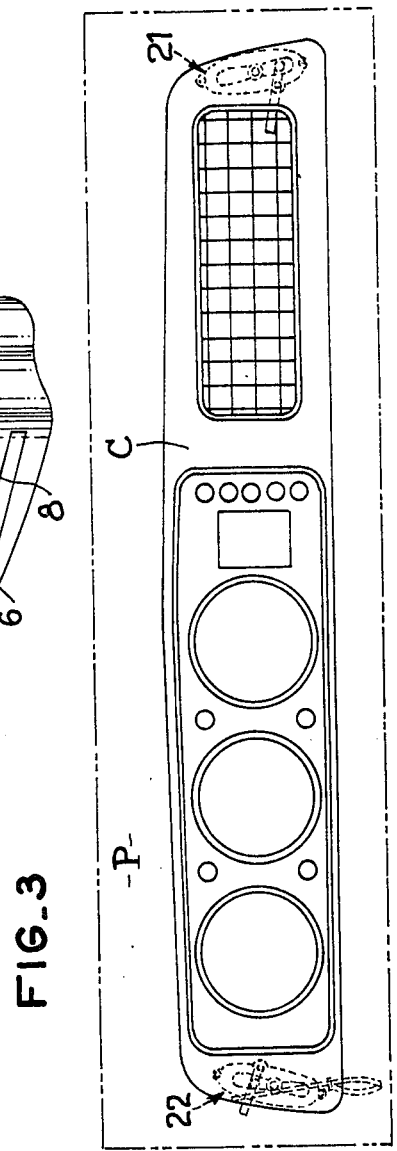
FIG. 3 is a general view of the dashboard of an automobile, the instrument panel assembly being fixed to the dashboard by means of devices according to the invention.

FIG. 3 schematically shows an instrument panel assembly C of an automobile fixed to the dashboard P by means of fixing devices 21 and 22 according to the invention. Details of mounting of assembly C are shown in FIG. 4.

This Figure shows that the right-hand end of assembly C is fixed to the dashboard P by means of a clip 21 of the type shown in FIG. 1, and of which the bent lever 23 is accessible through an aeration grid G which forms part of the instrument panel assembly.

Consequently, if the assembly C is to be disassembled, its right-hand side may be easily disengaged by opening the clip 21 by simple actuation of lever 23. On the other hand, the element 22 for fixing the left-hand side of assembly C is not directly accessible when the assembly is in place.

In order to actuate the bent lever 24 of this second device, a strap 25 which may be reached beneath the dashboard is fixed to the free end of the lever 24.

In the embodiment shown, the fasteners cooperating with clips 21 and 22 are of the type shown in FIG. 5.

On the frame of the dashboard P against which the facade F of the assembly C is applied, there is fixed a pin 26 which comprises a fixing head 27, a cylindrical portion 28 and a conical head 29 whose diameter is larger than that of the cylindrical portion 28 and which is connected to said latter by a shoulder 30.

When the pin 26 engages the clip 22, the conical head 29 causes the lips 5 and 6 to be spaced apart and thereafter to close again on the cylindrical portion 28 of the pin 26 at shoulder 30 level.

To open the clip and consequently release the pin 26, it suffices to pull on strap 25 and the lips 5 and 6 are spaced apart in the manner described with reference to FIG. 1.

The fixing device described with reference to FIGS. 1 to 5 is considered as being applied to the fixing of an instrument panel assembly on the dashboard of a vehicle, but it may of course be used in other applications where one element is to be fixed to another without the use of screws or other visible fixing means, and where assembling and disassembling must be rapid.

Having now described our invention what we claim as new and desire to secure by Letters Patent is:

1. A device for removably fixing, by interlocking, a first element on a second element and comprising:
   a pin provided with a shouldered head, securely fastened to said second element,
   a clip fastened to said first element and adapted to receive and removably grip the pin, wherein the clip is constituted by:
   (a) a frame,
   (b) two resilient lips provided in said frame and integral therewith, and defining a central recess adapted to receive said pin, and at least one lateral recess,
   (c) a member for spacing said lips apart in order to release said pin, said lip-spacing member being rotatably mounted on said frame and comprising an angularly movable finger engaged within said lateral recess.

2. A device as claimed in claim 1, wherein the two resilient lips define:
   a central recess for receiving the pin,
   a first and a second lateral recesses, the first lateral recess receiving the lip-spacing member, and the lips are connected to the frame by lugs at the ends of the two lateral recesses opposite said central housing.

3. A device as claimed in claim 2, wherein said first lateral recess which receives the lip-spacing member is connected to said frame by two lugs, whilst the opposite, second lateral recess is connected to the frame by one lug only.

4. A device as claimed in claim 1, wherein said lip-spacing member is constituted by an actuating lever, a shaft extending said lever and disposed in a bore provided in the wall of the frame, a rod secured to said lever, and a finger mounted at the end of said rod.

5. A device as claimed in claim 4, wherein said cylindrical finger is integral with the rod which comprises a recess of square cross-section adapted to receive a portion of the lever of corresponding cross-section.

6. A device as claimed in claim 4, wherein said bore of said frame receiving said shaft is an open bore in which said shaft is mounted by interlocking.

7. A device as claimed in claim 4, wherein the actuating lever is a bent lever.

8. A device as claimed in claim 7, wherein said lever is provided at its end opposite said shaft with an actuator strap.

9. A device as claimed in claim 1, applied to the fixing of an instrument panel assembly on the dashboard of an automobile, the two ends of the assembly being respectively provided with said pin engaged in a corresponding said clip fixed on said dashboard.

* * * * *